United States Patent
Andersson et al.

(10) Patent No.: US 9,049,457 B2
(45) Date of Patent: Jun. 2, 2015

(54) PIXEL PREDICTION FOR VIDEO CODING

(75) Inventors: Kenneth Andersson, Gavle (SE); Per Frojdh, Stockholm (SE); Clinton Priddle, Upplands Vasby (SE); Jonatan Samuelsson, Skarpnack (SE); Rickard Sjoberg, Tumba (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 1098 days.

(21) Appl. No.: 12/808,958

(22) PCT Filed: Jul. 16, 2008

(86) PCT No.: PCT/EP2008/005895
§ 371 (c)(1),
(2), (4) Date: Jun. 17, 2010

(87) PCT Pub. No.: WO2009/080132
PCT Pub. Date: Jul. 2, 2009

(65) Prior Publication Data
US 2011/0007801 A1  Jan. 13, 2011

Related U.S. Application Data

(60) Provisional application No. 61/016,006, filed on Dec. 21, 2007.

(51) Int. Cl.
*H04N 19/593* (2014.01)
*H04N 19/176* (2014.01)
(Continued)

(52) U.S. Cl.
CPC ........... *H04N 19/593* (2014.11); *H04N 19/176* (2014.11); *H04N 19/147* (2014.11);
(Continued)

(58) Field of Classification Search
CPC ................. H04N 19/593; H04N 19/00763
USPC ....................... 375/240.13, 240.14
See application file for complete search history.

(56) References Cited

U.S. PATENT DOCUMENTS

| 6,185,340 | B1 * | 2/2001 | Comer | 382/236 |
| 2002/0044696 | A1 * | 4/2002 | Sirohey et al. | 382/240 |

(Continued)

FOREIGN PATENT DOCUMENTS

| EP | 0895424 A2 | 2/1999 |
| EP | 1761063 A2 | 3/2007 |

(Continued)

OTHER PUBLICATIONS

Balle, J. et al. "Extended Texture Predictipn for H.264 Intra Coding." ITU—Telecommunications Standardization Sector, Document VCEG-AE11, Study Group 16 Question 6, Video Coding Experts Group (VCEG), 31st Meeting: Marraketch, MA, US, Jan. 15-16, 2007.

(Continued)

*Primary Examiner* — David N Werner
(74) *Attorney, Agent, or Firm* — Coats & Bennett, PLLC

(57) ABSTRACT

A method of encoding an input video frame into an encoded video frame comprises the steps of disassembling the input video frame into a plurality of blocks of pixels. For each block being a current block, the method further comprises generating a corresponding predicted block from already reconstructed pixels, generating a residual block by subtracting the predicted block from the current block, generating a reconstructed block from the residual block and the predicted block, and generating the encoded video frame from the residual block The method further entails creating a local structure of reconstructed pixels in a region of the predicted block and aligning the predicted block with the local structure to produce an aligned predicted block, wherein the aligned predicted block is used in the steps of generating the residual block and generating the corresponding reconstructed block.

40 Claims, 4 Drawing Sheets

(51) Int. Cl.

| | |
|---|---|
| *H04N 19/147* | (2014.01) |
| *H04N 19/103* | (2014.01) |
| *H04N 19/117* | (2014.01) |
| *H04N 19/17* | (2014.01) |
| *H04N 19/194* | (2014.01) |
| *H04N 19/82* | (2014.01) |
| *H04N 19/523* | (2014.01) |
| *H04N 19/61* | (2014.01) |

(52) U.S. Cl.
 CPC ........... *H04N19/103* (2014.11); *H04N 19/117* (2014.11); *H04N 19/17* (2014.11); *H04N 19/194* (2014.11); *H04N 19/82* (2014.11); *H04N 19/523* (2014.11)

(56) References Cited

U.S. PATENT DOCUMENTS

| | | | |
|---|---|---|---|
| 2006/0013299 A1* | 1/2006 | Sato et al. | 375/240.03 |
| 2006/0013310 A1 | 1/2006 | Lee et al. | |
| 2006/0072660 A1* | 4/2006 | Jia et al. | 375/240.03 |
| 2006/0072668 A1* | 4/2006 | Srinivasan et al. | 375/240.24 |
| 2006/0245501 A1* | 11/2006 | Gordon et al. | 375/240.24 |
| 2008/0107349 A1* | 5/2008 | Sung et al. | 382/245 |
| 2008/0147764 A1* | 6/2008 | Alois et al. | 708/401 |

FOREIGN PATENT DOCUMENTS

| | | |
|---|---|---|
| EP | 1761064 A2 | 3/2007 |
| EP | 1729521 A2 | 12/2008 |
| WO | 01/49038 A1 | 7/2001 |

OTHER PUBLICATIONS

Kamp, S. et al. "Decoder Side Motion Vector Derivation." Institut fur Nachrichtentechnik, TWTH Aachen University, VCEG Meeting, MPEG Meeting, Oct. 20, 2007.

Suzuki, Y. et al. "Inter Frame Coding with Template Matching Averaging." IEEE International Conference on Image Processing, 2007 (ICIP 2007), Sep. 1, 2007.

Tan, T. K. et al. "Intra Prediction by Averaged Template Matching Predictors." 4th IEEE Consumeer Communications and Networking Conference, 2007 (CCNC 2007), Jan. 1, 2007.

Vatis, Y. et al. "Two-Dimensional Non-Separable Adaptive Wiener Interpolation Filter for H.264/AVC." Institut fur Theoretische Nachrichtentechnik und Informationsverarbeitung, International Organisation for Standardisation, ISO/IEC JTC 1/SC 29/WG 11, Apr. 2005.

Wittman, S. et al. "Separable Adaptive Interpolation Filter." International Telecommunication Union, COM 16-C 219-E, Jun. 2007.

Yamane, N. et al. "An Image Data Compression Method Using Extrapolative Prediction-Discrete Sine Transform; in the Case of Two-Dimensional Coding." Electronics and Communications in Japan, Part I, vol. 72, No. 6, 1989.

\* cited by examiner

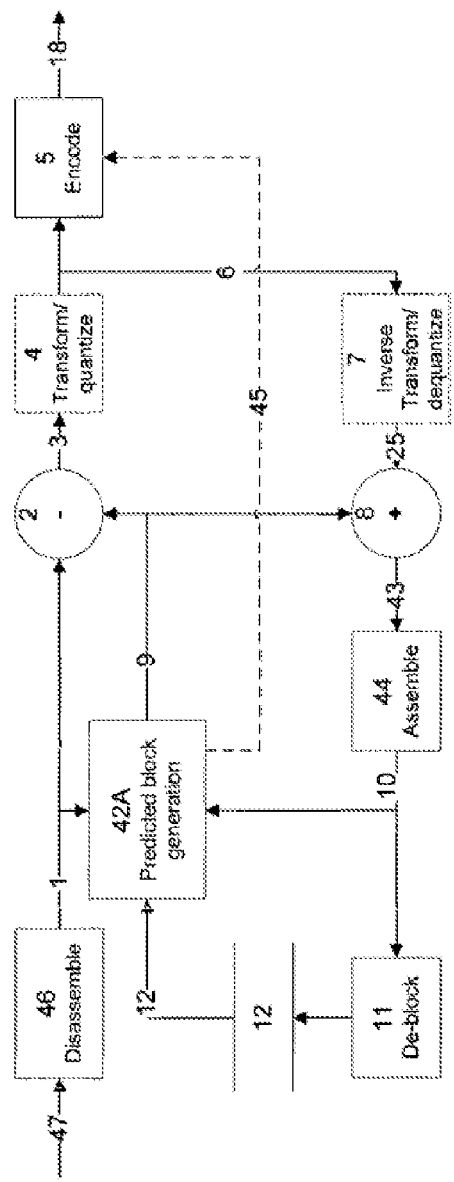
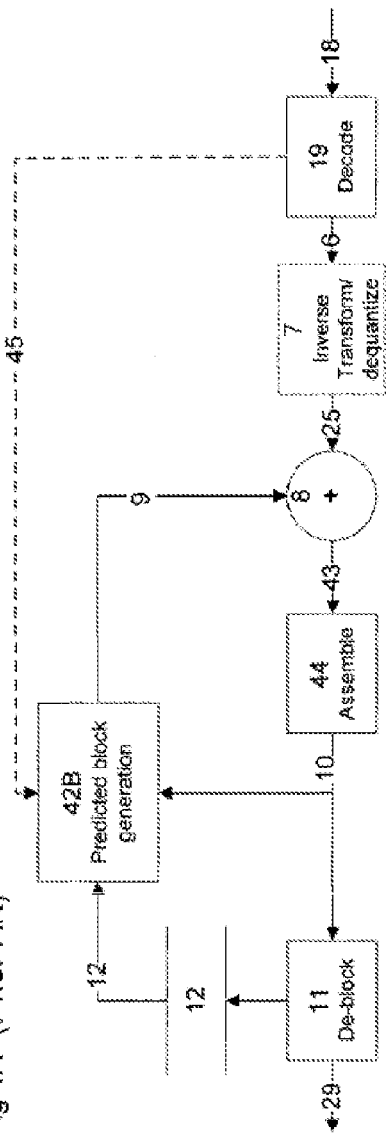
Fig 1A (Prior Art)
Fig 1B (Prior Art)

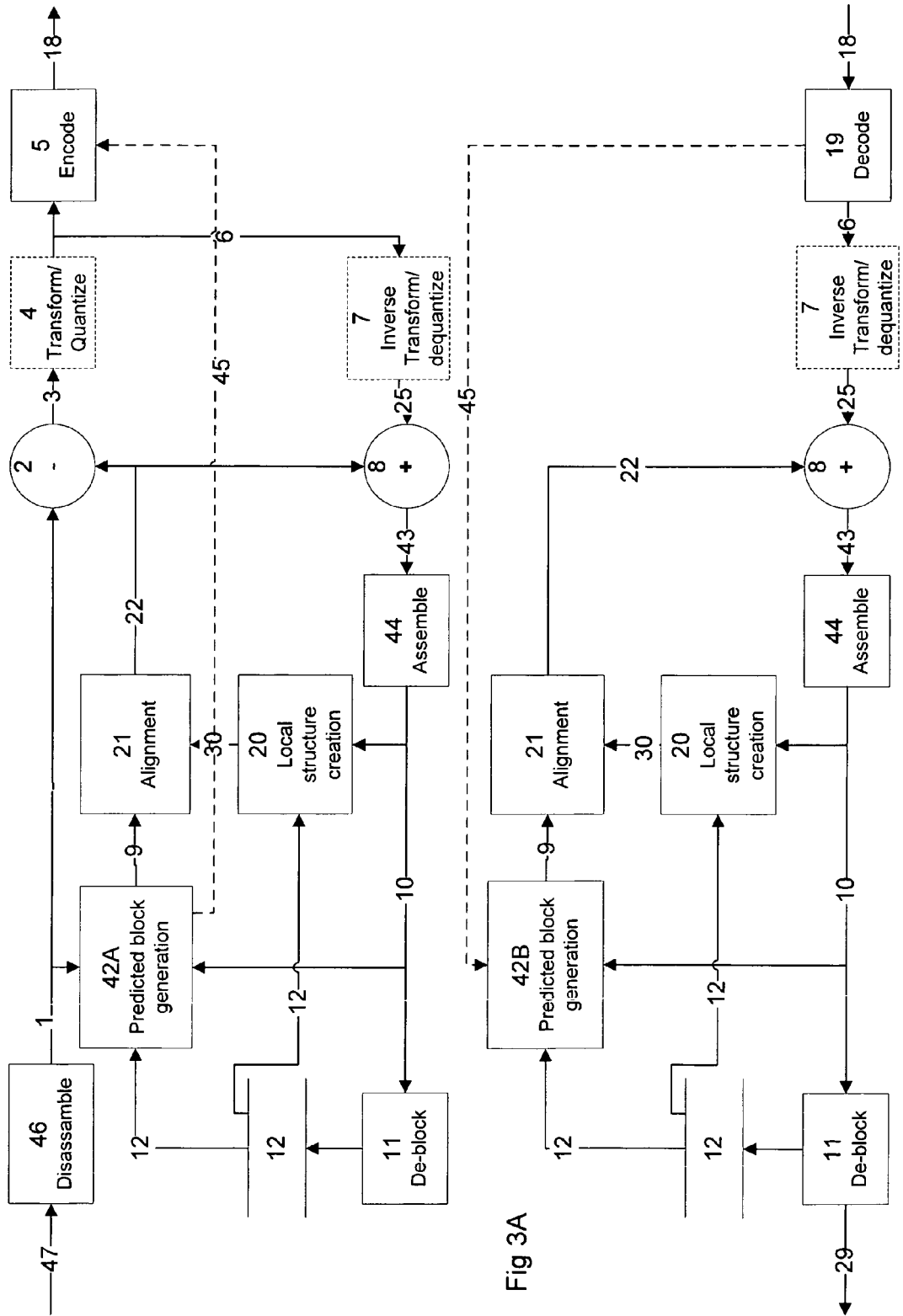

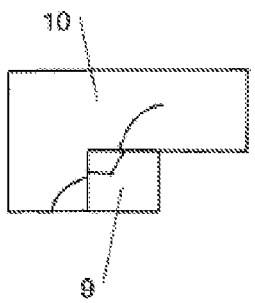 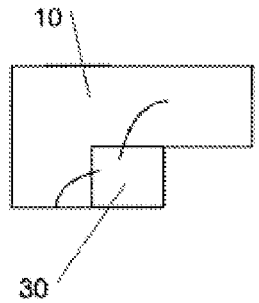 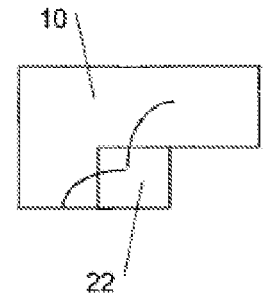
Fig 4A (Prior Art)   Fig 4B   Fig 4C
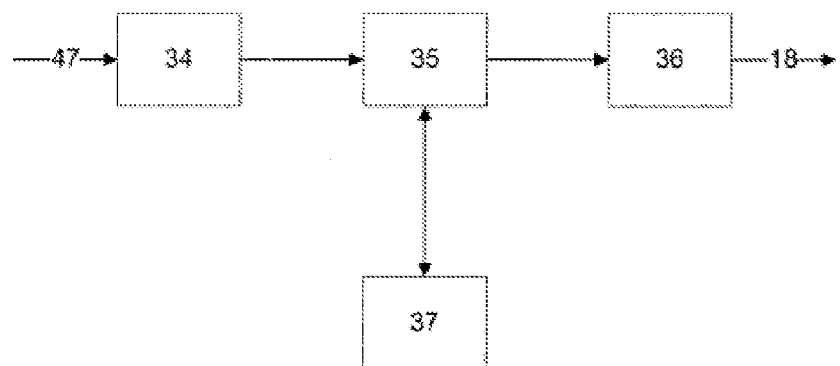
Fig 5A
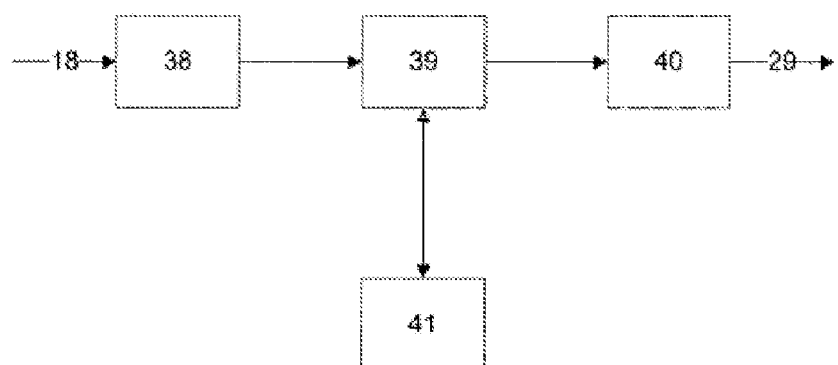
Fig 5B

US 9,049,457 B2

PIXEL PREDICTION FOR VIDEO CODING

FIELD OF THE INVENTION

The invention relates to a method of encoding a video frame into an encoded video frame, a method of video decoding, a video encoding apparatus, a video decoding apparatus, a computer readable medium with a computer program for a video encoding apparatus and a computer readable medium with a computer program for a video decoding apparatus. The invention more specifically relates to video encoding and video decoding having block prediction.

BACKGROUND

In video encoding/decoding an input video frame is encoded into an encoded video frame for storage or transmission, which encoded video frame is decoded in order to obtain a reconstruction of the original video signal. The encoding enables compression of the original video signal allowing that the compressed video signal can be stored on a storage medium requiring storage capacity which is only a small fraction of storage capacity that would be needed if the original video signal would be stored or transmission to another device requiring much less bandwidth, i.e. bits to be transmitted, compared to the bandwidth needed to transmit the original video signal.

In the art of video coding (H.264 [7] which is hereby incorporated by reference, H.263, MPEG2, MPEG4) the encoder performs all steps and makes all decisions necessary to compress the input video signal. All decisions taken by the encoder with respect to the encoding process are subsequently transmitted or stored for receipt or retrieval by the decoder and subsequently used in the decompression process. The decoder is passive in this respect and does not make any decisions on its own, operates dependently on the encoder. In recent contributions to Video Coding Expert Group (VCEG) of the International Telecommunication Union (ITU) adaptive filters have been proposed [1,2]. These filters are optimized on a frame by frame basis and coefficients are coded. They provide better coding efficiency than filters used in video compression standard H.264 for example.

Also there has been work on giving the decoder more freedom using template matching [3, 4, 5, 6], wherein the template refers to a region of previously decoded pixels adjacent to the block to be coded. All this has been attempted in an urge to further improve video encoding/decoding to achieve yet higher compression rates and/or improved perceived reconstructed image quality. In an attempt to further improve prediction, solutions have been investigated for adaptation of a prediction on a local basis.

Adaptation of a prediction on a local basis however costs many bits and can not be afforded for efficient video coding, where a more local adaptation potentially could reduce the prediction error. Local adaptive filters for inter-frame prediction could achieve this object, but are difficult to implement due the cost of coding filter coefficient and will cost many bits in storage or transmission.

Template matching is one way to achieve more local adaptation of a prediction without side information but in the matching search an area outside the predicted block is used. In other words the template matching search is based on reconstructed pixels other than the ones used for the actual prediction according to the best match. Errors in previously decoded regions due to communication channel errors or coding errors can propagate to the predicted block without any adjustments. It is therefore an object of the invention to enhance accuracy of predictions, i.e. predicted blocks, while preserving or limited increase of bandwidth, i.e. required bit capacity or bits to be encoded.

SUMMARY

The object is achieved according to a first aspect of the invention in a method of encoding an input video frame into an encoded video frame. The method comprises the steps of:
　disassembling the input video frame into a plurality of blocks of pixels; and for each block being a current block, performing the steps of:
　generating a corresponding predicted block from already reconstructed pixels;
　generating a residual block by subtracting the predicted block from the current block; and
　generating a reconstructed block from the residual block and the predicted block;
　generating the encoded video frame from the residual block; the method further comprising the steps of:
　creating a local structure of reconstructed pixels in a region of the predicted block; and
　aligning the predicted block with the local structure to produce an aligned predicted block; and
　wherein the aligned predicted block is used in the steps of generating the residual block and generating the corresponding reconstructed block.

The object is also achieved according to a second aspect of the invention in a method of decoding an encoded video frame into an decoded video frame. The method according to the second aspect of the invention comprises the steps of:
　generating an inverse transformed/dequantized residual block from the encoded video frame;
　for each generated inverse transformed/dequantized residual block performing the steps of:
　generating a predicted block from already reconstructed pixels;
　generating a reconstructed frame from the encoded video frame and the predicted block;
the method further comprising the steps of
　creating a local structure of reconstructed pixels in a region of the predicted block;
　aligning the predicted block with the local structure into an aligned predicted block; and
　wherein the aligned predicted block is used in the step of generating the corresponding reconstructed block.

By creating a local structure of reconstructed pixels in a region of the predicted block, a synthetic original is created with which the predicted block can be aligned where no previously reconstructed pixels are yet available. Pixels in the local structure are within the region of the predicted block and not outside as in template matching. The local structure of reconstructed pixels is derived or extended from previously reconstructed pixels, thus information from previously reconstructed pixels can be used more efficiently. The creation of a local structure of reconstructed pixels and subsequent alignment of the predicted block allows improved prediction of predicted blocks. Since the creation of local structure and alignment may take place within the encoding and decoding independently, no further bit capacity, i.e. bits to be coded, is required, from the encoding process to the decoding process or from the encoder to the decoder. Thus a further improvement in either reduced bit capacity for the encoded video frame or improved perceived reconstructed video quality is achieved.

The deployment of a local structure, i.e. a synthetic original, enables local modification of a predicted block on a region-by-region basis. Since a predicted block can be aligned with previously reconstructed pixels adjacent to the predicted block better robustness in the encoding and decoding and more particularly to communication channel errors is achieved. The use of an in-loop de-blocking filter as in H.264 can be reduced due to a better match between a prediction and previously reconstructed pixels in the local structure.

In an embodiment according to the invention, the step of generating a predicted block comprises generating a predicted block from reconstructed pixels in a previously reconstructed frame using inter-frame prediction information.

In another embodiment according to the invention, the step of generating a predicted block comprises generating a predicted block from reconstructed pixels in the current reconstructed frame using intra-frame prediction information. Thus the invention can be applied to both inter and intra-frame predicted blocks.

According to another embodiment of the invention the step of creating a local structure of reconstructed pixels in a region of the predicted block comprises generating pixels of the local structure using reconstructed pixels from the current reconstructed frame (intra-frame prediction).

This is similar to intra-frame prediction, which can be advantageously used to spatially extend known patterns and texture into the local structure.

According to another embodiment of the invention the step of creating a local structure of reconstructed pixels in a region of the predicted block comprises generating pixels of the local structure using previously reconstructed pixels from a previously reconstructed frame. This is similar to inter-frame prediction, whereby reconstructed pixels extend in temporal sense into the local structure. Temporal and spatial extensions however may also be combined to create a local structure.

Essentially according to the invention any prediction block, inter-frame or intra-frame, can be aligned to a local structure which may be created from any other method of generating a prediction either from a current reconstructed frame or a previously reconstructed frame.

According to another embodiment of the invention the step of creating a local structure of reconstructed pixels in a region of the predicted block comprises interpolating reconstructed pixels of the current reconstructed frame or the previously reconstructed frame into the region of the predicted block.

Reconstructed pixels surrounding the region of the predicted block from the current reconstructed frame can be used to interpolate not yet reconstructed pixels by linear or polynomial interpolation as an alternative method of intra-frame prediction to create the local structure. Alternatively, reconstructed pixels in a previously reconstructed frame can be interpolated as well to create the local structure.

According to another embodiment of the invention the step of creating a local structure of reconstructed pixels in a region of the predicted block comprises generating pixels of the local structure by extrapolating reconstructed pixels into a region of the predicted block.

Pixels from the current reconstructed frame or previously reconstructed frame or previously reconstructed frames can thus be extrapolated. This has the effect of extending the local structure to the pixel positions of the predicted block to enable an improved alignment of the predicted block to the local structure.

According to another embodiment of the invention the step of creating a local structure of reconstructed pixels in a region of the predicted block comprises applying reconstructed pixels from another previously reconstructed frame according to inter-frame prediction information of a neighbouring block into the region of the current reconstructed frame. This has the effect of extending the local structure of a neighbouring block to enable an improved alignment of a predicted block to the local structure.

Any method of performing creating a local structure of reconstructed pixels can be combined with at least one other method of performing creating a local structure of reconstructed pixels for example by interpolating between pixel values, or spatial interpolation between the pixels of the respective methods. This has the advantage that accuracy can be further enhanced using a plurality of approaches.

According to another embodiment of the invention the step of creating a local structure of reconstructed pixels in a region of the predicted block comprises determining a transfer function for predicting a row and/or column of the predicted block. The transfer function may be determined from pixels of at least one row and/or column of pixels to at least one next row and or column of reconstructed pixels adjacent to the predicted block.

By applying the transfer function to reconstructed pixels adjacent to the region of the block to be predicted to predict not yet reconstructed pixels in the region of the predicted block may be predicted. This has the effect of modelling how the local structure varies from one row to another row or from one column to another column. Thus the local structure can be extended to a region of a predicted block and enable improved alignment of a predicted block to the local structure. The transfer function may have temporal and spatial properties.

According to another embodiment of the invention the step of aligning the predicted block with the local structure comprises matching properties of pixels of at least part of the predicted block with corresponding properties of pixels of the local structure, and adapting the properties of the predicted block to the corresponding properties of the local structure based on the best match.

This has the effect of determining alignment of the predicted block based on the parts of local structure allowing improvement of the visual quality of the aligned predicted block and reducing residual error using the aligned predicted block in combination with residual coding. Alignment can thus be interpreted broadly as being brought into correspondence and is not limited to a position of the predicted block with respect to the local structure, but any property relating to the pixels in the predicted block and local structure may be aligned, such as and not limited to luminance, chrominance, texture, and also spectral content, phase relationship.

According to another embodiment of the invention the step of matching properties of pixels of at least part of the predicted block with corresponding properties of pixels of the local structure comprises establishing a sum of squared differences or of absolute differences of the value of properties of pixels of at least part of the predicted block and the value of the corresponding properties of pixels of the local structure, and wherein the best match is determined by the lowest sum.

This has the effect that a variety matches may be evaluated, wherein the one that gives least difference is selected.

According to a another embodiment of the invention the step of matching properties of pixels of at least part of the predicted block with corresponding properties of pixels of the local structure comprises determining a spatial transfer function between at least part of the predicted block and the local structure and the step of adapting the properties of the predicted block to the corresponding properties of the local structure based on the best match comprises applying the spatial transfer function to the predicted block to obtain an aligned predicted block.

This has the effect of establishing a modification for modifying the predicted block and applying the modification to get similar characteristics as the local structure. Some examples of characteristics are displacement, but also texture, smoothness/sharpness. It can be noted that the reconstructed pixels that are used for the generation of the predicted block can be used directly in the step of producing an aligned predicted block according to the invention.

According to another embodiment of the invention, the step of determining a spatial transfer function between part of the predicted block and the local structure is performed by selecting a spatial transfer function from a set of predetermined spatial transfer functions.

This has the advantage that a spatial transfer function may be selected from for example transfer functions already present according to H.264 [7] standard. By selecting a transfer function from a set instead of calculating coefficients, computation time may be saved.

According to another embodiment of the invention the step of aligning the predicted block on the location of the best match comprises sub-pel interpolating pixels of the predicted block or of the local structure to allow sub-pel matching and positioning of the predicted block with respect of the local structure.

This has the effect of further fine tuning the aligning of the predicted block with the local structure, for example by displacement of the predicted block vertically and horizontally or rotating the predicted block, to get a better match with the characteristics of the local structure.

According to another embodiment of the invention, the step of matching properties of pixels of at least part of the predicted block with corresponding properties of pixels of the local structure and the step of adapting the properties of the predicted block to the corresponding properties of the local structure based on the best match is performed on pixels originating the predicted block.

This has the advantage that the predicted block is aligned in a single step of computing without actually generating the predicted block, saving computation time.

According to another embodiment of the invention, the properties of pixels of at least part of the predicted block and corresponding properties of pixels of the local structure are based upon a transform of pixels of the local structure, and wherein the predicted block is adapted according to the transform of pixels of the local structure on the basis of the best match.

This has the effect of enabling alignment according to for example frequency domain, for example emphasizing high frequency features such as edges, phase domain features, for example a line representation in the phase domain, or visual error.

According to another embodiment of the invention, the step of matching properties of pixels of at least part of the predicted block with corresponding properties of pixels of the local structure comprises determining a position best matching pixel values of the predicted block with pixel values of the local structure of reconstructed pixels, and wherein the step of adapting the properties of the predicted block to the corresponding properties of the local structure comprises positioning the predicted block to the position best matching pixel values of the predicted block with pixel values of the local structure of reconstructed pixels.

This allows accurate positioning of a predicted block with respect to a local structure.

The object of the invention is also achieved in a third aspect of the invention in a video encoding apparatus comprising an input interface for receiving an input video frame, an output interface for outputting an encoded video frame and processing means and a memory and/or dedicated hardware means, arranged for performing the steps of the above described method and embodiments.

The object of the invention is also achieved in a fourth aspect of the invention in a video decoding apparatus comprising an input interface for receiving an encoded video frame, an output interface for outputting a decoded video frame, and processing means and a memory and/or dedicated hardware means arranged for performing the steps of the above described method and associated embodiments.

The object of the invention is also achieved in a fifth aspect of the invention in computer readable medium having stored thereon computer instructions which, when loaded into the memory and processed by the processor of the above mentioned encoding apparatus, perform the steps of the above described method and associated embodiments.

The object of the invention is also achieved in a sixth aspect of the invention in computer readable medium having stored thereon computer instructions which, when loaded into the memory and processed by the processor of the above mentioned decoding apparatus, perform the steps of the above described method and associated embodiments.

BRIEF DESCRIPTION OF THE DRAWINGS

The invention will be detailed further below, referring to the accompanying drawings, wherein:

FIG. 1A shows a block diagram of a process for encoding an original video frame according to the state of the art.

FIG. 1B shows a block diagram of a process for decoding an encoded video frame into a reconstructed video frame according to the state of the art.

FIG. 3A shows a block diagram of a process for decoding an original video signal into an encoded video frame according to an embodiment of the invention.

FIG. 3B shows a block diagram of a process for decoding an encoded video frame into a reconstructed video signal according to an embodiment of the invention.

FIG. 4A shows an example of a predicted block to be fitted into a reconstructed frame according to the state of the art.

FIG. 4B shows an example of a local structure of pixels created from the current reconstructed frame according to an embodiment of the invention.

FIG. 4C shows the predicted block of FIG. 4A aligned with the local structure of FIG. 4B according to an embodiment of the invention.

FIG. 5A shows a block diagram of an encoding apparatus according to an exemplary embodiment of the invention.

FIG. 5B shows a block diagram of a decoding apparatus according to an exemplary embodiment of the invention.

DETAILED DESCRIPTION OF THE INVENTION

Figure 2A:
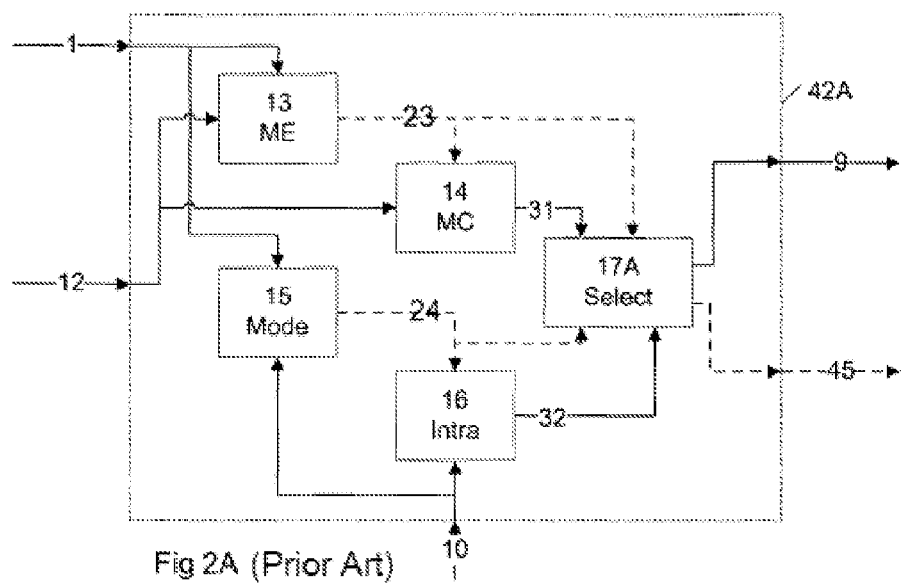
FIG. 2A shows a block diagram of an example of predicted block generation in encoding an input video frame according to the state of the art.

The invention will be explained in detail below by exemplary embodiments and will be better understood if read with reference to the accompanying figures. Through the figures each block represents a processing step having data and/or control information as input and/or output. Data are represented by solid arrows and can be a block or a frame of pixels.

Control information is represented by dashed arrows. Through the figures like reference numerals are used for like features.

Each of the blocks in the figures may however be implemented in dedicated hardware processors. Likewise data and control information may be implemented in hardware as electronic signals, used for communicating between and controlling the various hardware processors respectively.

The general concept of video encoding is based upon a process or method of encoding an input video frame comprising the steps of disassembling input video frames into blocks of pixels of various sizes, e.g. 4×4, 8×8 or 16×16, whereby a difference or residual block is generated by subtracting a predicted block from a current block of the input video frame. The residual block is encoded into an encoded video frame. The residual block is used to create a reconstructed block from the predicted block and the residual block, which is assembled together with previously reconstructed blocks into a reconstructed frame from which the predicted block is generated.

By providing a decoding process or method generating a reconstructed frame the same way as in the encoding process, a reconstructed frame is generated in the decoding process, which may after some post-processing be output as a decoded video frame.

Since the encoding process and decoding process both produce a current reconstructed frame from which a predicted block is generated, it is possible for the decoding process to follow the encoding process and produce a decoded video frame resembling the original input video frame.

FIG. 1A shows a block diagram of a process for encoding an input video frame 47 according to the state of the art (H.26x, MPEG2, MPEG4), wherein the input video frame 47 is disassembled 46 in a plurality of blocks 1, whereby each disassembled block 1 is successively processed in a processing cycle. Current block 1, one of the disassembled generated blocks from the input video frame 47, is encoded into an encoded video frame 18, which is to be transmitted to a decoding process as depicted in FIG. 1B. Thus input video frame 47 is blockwise encoded and transferred to a decoding process. It is clear that by consecutively encoding input video frames 47, streaming video can be encoded into a continuous encoded video frame 18. Intermediate storage can be performed between encoding and decoding in encoded form such as for example on a Compact Disc (CD) or Digital Versatile Disc (DVD) or any other storage medium.

In FIG. 1A, in a cycle of the encoding process, for a current block 1, a predicted block 9 is used to generate a residual block 3 by subtracting 2 the predicted block 9 from the current block 1. Subtracting 2 the predicted block 9 from the current block 1 may be performed by subtracting pixelvalues of pixels of the predicted block 9 from pixelvalues of corresponding pixels of the current block 1.

The residual block 3 is optionally transformed/quantized 4 (optional blocks are indicated with dashed lines) into a transformed block 6, which in turn is encoded 5, to generate the encoded video frame 18. The step of optionally transforming/quantizing 4 residual block 3 into a transformed block 6 may involve for example Discrete Cosine Transformation (DCT). The step of transforming 4 the residual block 3 may additionally involve quantization of the resulting transformed block to limit the number of possible values of the transformed residual block 6. This will reduce the workload of the encoding step 5. Encoding 5 may involve entropy coding, i.e. for example Huffman coding or any other coding scheme for reducing the amount of bits required for digital transmission.

The transformed block 6 is optionally inverse transformed and/or dequantized 7 into an inverse transformed/dequantized residual block 25. The inverse transformed/dequantized residual block 25, representing the residual block 3, is then added 8 to the predicted block 9 to generate a reconstructed block 43. This reconstructed block 43 is assembled 44 together with previously reconstructed blocks 43 to form at least part of a current reconstructed frame 10, which can thus be used for intra-frame prediction in the next cycle. The current reconstructed frame 10 is stored to provide a previously reconstructed frame 12. In the description below, it is assumed for completeness sake that the optional steps of transforming/quantizing 4 and inverse transforming 7 are in place.

The predicted block 9 is generated 42A according to the state of the art by inter-frame prediction using the previously reconstructed frame 12 or by inter-frame prediction using the current reconstructed frame 10.

Prediction control information 45 from the prediction generation step 42A may be coded 5 along with the transformed residual block 6 to be included into the encoded video frame 18. Examples of prediction control information 45, but not limited to, are block partition information, motion vectors, reference frame numbers indicating from which previously reconstructed video frames 12 the predicted block 9 shall come from in the case of inter-frame prediction and block partition information and intra-frame prediction modes in the case of intra-frame prediction.

The current reconstructed frame 10 may be de-blocked 11 and stored to create the previously reconstructed frame 12 whereby block boundaries are filtered out such that they are no longer apparent for a viewer. It should be noted that variations are possible to this general approach.

FIG. 1B shows a block diagram of a process for decoding an encoded video frame 18 into an decoded video frame 29 according to the state of the art.

The decoding process is shown from right to left in FIG. 1B. The encoded video frame 18 is first decoded 19 and inverse transformed 7 into an inverse transformed/dequantized residual block 25. A predicted block 9 is added 8 to the inverse transformed/dequantized residual block 25 to generate a reconstructed block 43. Adding 9 may be performed by adding pixel values of pixels of the predicted block the inverse transformed/dequantized residual block 25 to pixel values of pixels of the predicted block 9. The reconstructed block 43 is assembled 44 together with previously reconstructed blocks 43 to form a current reconstructed frame 10. The current reconstructed frame 10 is further stored to provide a previously reconstructed frame 12.

As in FIG. 1A, the current reconstructed frame 10 may be de-blocked 11 and stored to create the previously reconstructed frame 12 whereby block boundaries are filtered out such that they are no longer apparent for a viewer, thus producing the resulting decoded video frame 29, which can for example be forwarded to a display for viewing.

The predicted block 9 is generated 42B according to the state of the art by inter-frame prediction using the previously reconstructed frame 12 or by inter-frame prediction using the current reconstructed frame 10. Prediction control information 45 from the prediction generation step 42A in the encoding process may be decoded 19 along with the encoded transformed residual block 6 to be used in the predicted block generation 42B.

The process of decoding the encoded video frame 18 is similar to the encoding process in that both the encoding process and the decoding process need to generate a current reconstructed frame 10 and a previously reconstructed frame 12 from which a predicted block 9 is to be generated either by inter-frame prediction or by intra-frame prediction. It must be ensured that for each corresponding cycle in the encoding process of FIG. 1A and the decoding process of FIG. 1B the predicted blocks 9 are identical. If the predicted block generation 42A/42B of the encoding and decoding processes respectively were different, the resulting decoded video frame 29 would not be an accurate representation of the input video frame 47.

FIG. 2A shows an example of predicted block generation 42A in the encoding process according to the state of the art. Inter-frame prediction and intra-frame prediction can both be performed. In inter-frame prediction motion estimation 13 is performed of the current block with respect to the previously reconstructed frame 12. The result of motion estimation 13, inter-frame prediction information 23, can be a motion vector and an indication which block from the previously stored frame 12 is used. An inter-frame predicted block 31 can be generated by means of inter-frame prediction compensation 14 using the previously reconstructed frame 12 and the inter-frame prediction information 23.

In intra-frame prediction, an intra-frame prediction mode can be determined in step 15 by comparing the current block 1 to already reconstructed pixels in the current reconstructed frame 10. The intra prediction mode together with an indication which block is to be used for intra-frame prediction form intra-frame prediction information 24. An intra-frame predicted block 32 can be generated based upon the current reconstructed frame 10 and intra-frame prediction information 24 by performing the step of intra-frame prediction generation 16.

The best matching prediction is selected in a selection step 17A for further processing resulting in the predicted block 9 and corresponding prediction information 45.

Figure 2B:
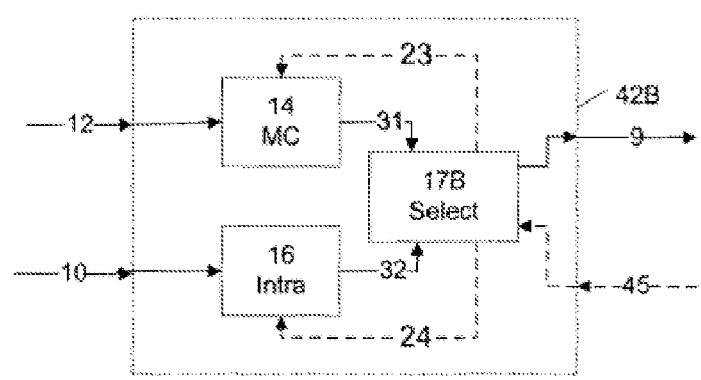
FIG. 2B shows a block diagram of a sub-process of predicted block generation in decoding an encoded video frame according to the state of the art.

In FIG. 2B an example of prediction generation 42B is shown for the decoding process. Depending on the decoded prediction information 45 the selection step 17B selects the prediction established in the predicted block generation 42A of FIG. 2A. Either inter-frame prediction is selected, wherein motion compensation 14 is performed using motion prediction information 23 generating an inter-frame predicted block 31 using a previously reconstructed frame 12 or intra-frame prediction is selected, wherein intra-frame prediction information 24 is provided to perform intra-frame predicted block generation 16, generating an intra-frame predicted block 32 based on the intra-frame prediction information 24 and the current reconstructed frame 10. The resulting predicted block 9 is used in the decoding process of FIG. 1B.

FIG. 3A shows a block diagram of a process for decoding an input video frame 47 into an encoded video frame 18 according to an embodiment of the invention. The process of FIG. 3A is similar to the process of FIG. 1A in that for each current block 1, a predicted block 9 and according to the invention an aligned block 22 is used to generate a residual block 3 by pixelwise subtracting 2 the aligned predicted block 22 from the current block 1. The residual block 3 is transformed 4 into a transformed block 6, which in turn is encoded 5, to generate the encoded video frame 18. The step of transforming 4 residual block 3 into a transformed block 6 may involve for example Discrete Cosine Transform (DCT) and/or quantisation of the resulting transform to limit the number of possible values of the transformed residual blocks. This will reduce the workload of the encoding step 5. Encoding 5 may involve entropy coding, i.e. for example Huffman coding or any other coding scheme for reducing the amount of bits required for digital transmission.

The transformed block 6 is inverse transformed 7 into an inverse transformed/dequantized residual block 25. The inverse transformed/dequantized residual block 25, representing the residual block 3, is then added 8 to the aligned predicted block 22 to generate a reconstructed block 43. This reconstructed block 43 is assembled 44 together with previously reconstructed blocks 43 to form at least part of a current reconstructed frame 10, which can thus be used for intra-frame prediction in the next cycle. The current reconstructed frame 10 is stored to provide a previously reconstructed frame 12.

The aligned predicted block 22 is an improved version of predicted block 9. Predicted block 9 is generated according to the state of the art by performing predicted block generation 42A, further detailed in FIG. 2A. However according to the invention this predicted block 9 is aligned 21 with a local structure of reconstructed pixels 30, resulting in aligned predicted block 22.

According to the invention, a step of creating 20 of a local structure of reconstructed pixels 30 is performed in a region of the predicted block 9, where not yet reconstructed pixels in the current reconstructed frame are to be created. The purpose of the local structure of reconstructed pixels 30 is to create an as good as possible representation of the pixel values in at least some aspect or in at least part of the region of the predicted block 9.

The region of not yet reconstructed pixels overlaps with predicted block 9 using reconstructed pixels from the current reconstructed frame 10 and/or from a previously reconstructed frame 12, meaning that generally the local structure of reconstructed pixels 30 may extend beyond the limits of the predicted block 9. Some examples of creating 20 a local structure of reconstructed pixels 30 will be detailed further below.

The predicted block 9 is aligned with the local structure of reconstructed pixels 30 in the step of alignment 21 resulting in an aligned predicted block 22. This enables a fine tuning of the predicted block 9. It is this aligned predicted block 22 which is then subsequently used in the step of generating the residual block 3 by subtracting 2 the aligned predicted block 22 from the current block 1. It will be clear that since the aligned predicted block 22 is fine tuned to the local structure of reconstructed pixels 30, the resulting reconstructed block 43 and subsequent resulting current reconstructed frame 10 and the ultimately resulting de-blocked decoded video frame 29 are of better quality than according to the state of the art.

FIG. 3B shows a block diagram of a process for decoding an encoded video frame into a reconstructed video signal according to an embodiment of the invention. The step of generating 42B a predicted block 9 is performed similar to the state of the art as described in FIG. 1B. Furthermore, similar to the encoding process according to the invention shown in FIG. 3A, a local structure of reconstructed pixels 30 is created 20 in a region corresponding to the predicted block 9. The predicted block 9 can then be aligned 21 with the local structure of reconstructed pixels 30 to generate the aligned predicted block 22. The step of generating the reconstructed block 43 is then performed by the adder 8 in pixelwise adding an inverse transformed/quantized residual block 25 to the aligned predicted block 22 and assembling 44 the thus formed reconstructed block 43 to the current reconstructed frame 10. The inverse transformed/dequantized residual block 25 in turn has been generated by decoding the encoded video frame 18 as in FIG. 1B.

In a further improvement of the invention the step of creating 20 a local structure of reconstructed pixels 30 and/or the step of aligning 21 a predicted block 9 to the local structure of reconstructed pixels 30 in the process of encoding a not shown input video frame 47 as discussed above may signal creation information and alignment information together with prediction information to the corresponding decoding process as discussed above and illustrated in FIG. 3B. In this way the encoder can select for which blocks the creating 20 a local structure of reconstructed pixels 30 and alignment 21 according to the invention shall be used. Also the corresponding decoding process can be informed beforehand how the creating 20 a local structure of reconstructed pixels 30 can be performed and how the predicted block 9 is alignment 21 is to be performed according to the invention by incorporating corresponding instructions in the creation information and alignment information respectively. This can limit the amount of work for the decoding process and also give some further guidance for the decoding process to best create a local structure of reconstructed pixels 30 and/or to know where alignment 21 is best applied. Some additional bits may be required in the encoding step 5 to generate the encoded video frame 18, but the quality of the current reconstructed frame 10 is improved.

FIG. 4A shows an example of a predicted block 9 to be fitted into a current reconstructed frame 10 according to the state of the art. The predicted block 9 may be generated 42A or 42B by inter- or intra-frame prediction. From FIG. 3A it is clear that the predicted block 9 does not quite fit in with the surrounding pixels of the current reconstructed frame 10.

FIG. 4B shows an example of creating 20 a local structure of reconstructed pixels 30 using pixels from the current reconstructed frame 10 according to an embodiment of the invention. The local structure of reconstructed pixels 30 in this example may be based upon extending features from already reconstructed pixels in the current reconstructed frame 10, for example by means of intra-frame prediction.

FIG. 4C shows the predicted block 9 of FIG. 3A aligned 21 with the local structure of reconstructed pixels 30 of FIG. 3B resulting in an aligned predicted block 22 according to an embodiment of the invention. The predicted block 9 was positioned according to a best match with corresponding pixels of the local structure of reconstructed pixels 30 from FIG. 3B.

In the sections below embodiments of creating 20 a local structure of reconstructed pixels and alignment 22 will be discussed in more detail.

Spatial Transfer Functions

In creating 20 a local structure of reconstructed pixels 30 and in the step of aligning the predicted block to the local structure of reconstructed pixels 30, spatial transfer functions are used providing for a mathematical model.

In the art of inter-frame prediction and also intra-frame prediction a spatial transfer function can be applied on pixels of a reference frame such as the current reconstructed frame 10 or previously reconstructed frame 12 in order to obtain a predicted block 9. The aim of the spatial transfer function is to re-position pixels of the reference frame according to prediction information from the reference frame to the pixel positions of current block 1. In Equation 1 the general case of applying a two dimensional spatial transfer function is described:

$$P(k,l) = \sum_{i=0}^{N-1}\sum_{j=0}^{M-1} wf(i,j)R\left(k+k_1-i+\text{int}\left(\frac{N}{2}\right)+\text{int}(v_k), l+l_1-j+\right.$$

-continued
$$\left.\text{int}\left(\frac{M}{2}\right)+\text{int}(v_l)\right)+o,$$

wherein P(k,l) is a pixel at row k and column l of the predicted block, R is the reference frame, $f(i,j)$ is a value of a two dimensional spatial transfer function with N rows and M columns at position (i,j), $k_1$ and $l_1$ are offsets positioning a block corresponding to the position of the current block 1 in the reference frame, $v_l$ and $v_k$ are prediction information 45, i.e. displacement in the horizontal direction (along a row) respectively the vertical direction (along a column) from the position of the current block 1, int(x) is the truncated integer value of x, w is a scaling factor and o is a DC offset.

The reference frame may be the current reconstructed frame 10 in the case of intra-frame prediction or the previously reconstructed frame 12 in the case of inter-frame prediction, whereas the prediction information is intra-frame prediction information 24 and inter-frame prediction information 23 respectively.

The use of spatial transfer functions is known from [7], wherein a set of spatial transfer functions relating to displacement of pixels has been defined. Two examples of spatial transfer functions are shown below. In Equation 2 a transfer function that re-positions pixel values to a regular spaced grid by bi-linear interpolation from positions exactly half way from the grid points in both the vertical and the horizontal direction is shown.

$$f = \begin{bmatrix} 0.25 & 0.25 \\ 0.25 & 0.25 \end{bmatrix} \quad \text{(Eq. 2)}$$

In Equation 3 a transfer function that filters pixel values without re-positioning is shown.

$$f = \begin{bmatrix} 0.05 & 0.1 & 0.05 \\ 0.1 & 0.4 & 0.1 \\ 0.05 & 0.1 & 0.05 \end{bmatrix} \quad \text{(Eq. 3)}$$

Frame adaptive transfer functions have also been deployed in the art, see reference [1,2]. In this case a frame adaptive spatial transfer function is determined for different categories of re-positioning according to prediction information 45. An adaptive spatial transfer function is a spatial transfer function having modifiable coefficients. By modifying the coefficients of the adaptive spatial transfer function the resulting pixels can be matched with already reconstructed pixels in the previously reconstructed frame 12 as reference pixels. The adaptive transfer function for each category that minimizes the squared error between predicted block 9 and current block of the current input frame 47 is selected by the encoding process, e.g. by means of least square minimization. The determined frame adaptive transfer function is encoded and selectively used to produce predicted block 9. The encoded adaptive spatial transfer function may then be decoded 19 and used by the decoding process.

Creating a Local Structure of Reconstructed Pixels

Below some exemplary embodiments of creating 20 a local structure of reconstructed pixels 30 will be discussed. According to an embodiment of the invention creating 20 a local structure of reconstructed pixels 30 can be performed using prediction techniques, i.e. inter-frame prediction and/or intra-frame prediction, similar to generating 42A/42B a predicted block 9.

Generally creating 20 a local structure of reconstructed pixels 30 is performed according to a different scheme for generating 42A/42B the predicted block 9, so that in the alignment step 21 of the predicted block 9 is performed on a local structure of reconstructed pixels 30 which have been created 20 differently from the pixels of the predicted block 9 itself. Thus a predicted block 9 generated by inter-frame prediction may be aligned 21 with a local structure of reconstructed pixels 30 created by intra-frame prediction techniques or vice versa, a predicted block 9 generated by intra-frame prediction techniques may be combined with a local structure of reconstructed pixels 30 using inter-frame prediction techniques, i.e. derived from a previously reconstructed frame 12.

It is however also possible to both perform the step of creating 20 a local structure of reconstructed pixels 30 and predicted block generation 42A/42B using both inter-frame prediction or using both intra-frame prediction, as long as the techniques used respectively are different.

Creating 20 a local structure of reconstructed pixels 30 can be performed in various ways. First creating 20 a local structure of reconstructed pixels 30 using pixel information from the current reconstructed frame 10 is discussed. As discussed above, the current reconstructed frame 10 is created by assembling reconstructed blocks 43 from the current and preceding processing cycles. The current reconstructed frame 10 thus contains previously reconstructed pixels which can be used to predict yet to be reconstructed pixels, similar to intra-frame prediction. In fact any method of intra-frame prediction can be used.

Pixels yet to be reconstructed, which will be forming the local structure of reconstructed pixels 30, in the region of the predicted block can for example be created by extrapolating pixel values from one or more rows or columns of already reconstructed pixels in one or more reconstructed block 43 or from rows and/or columns of previously reconstructed pixels in one or more reconstructed block 43 outside the block to be generated.

To create 20 the local structure 30 in the region of the predicted block 9 a spatial transfer function for displacement (see Equation 2 using interpolation with pixel re-positioning or Equation 3 without pixel re-positioning) can be used. In this example pixel values from one column of already reconstructed pixels of the current reconstructed frame 10 are used to determine pixels in another column, e.g. the adjacent column which forms part of the local structure 30, as shown in Equation 4:

$$L(k, l) = \sum_{i=0}^{N-1} a(i)R\left(k - i + \text{int}\left(\frac{N}{2}\right), l-1\right), \quad \text{(Eq. 4)}$$

wherein L(k,l) is a pixel of the local structure 30 at row k and column l, a(i) is the value of the transfer function in position i, R(k−i+int(N/2),l−1) represent pixels in the current reconstructed frame 10.

In this way the local structure of reconstructed pixels 30 in a region of the predicted block 9 can be produced according to the nearby pixel values of the currently reconstructed frame 10. In another embodiment the transfer function is applied on one row of pixels of the current reconstructed frame to produce another row in the local structure 30 and so forth.

In an embodiment a spatial transfer function is selected from a predetermined set of spatial transfer functions, that minimizes the squared error or the absolute error between the local structure and corresponding pixels of the current reconstructed frame 10. Such a set a spatial transfer functions is well known for a person skilled in the art, but is not limited to, from [7], wherein spatial transfer functions relating to displacement of pixels have been defined. Particularly spatial transfer functions performing displacement in combination with sub-pel interpolation and/or different degrees of low pass filtering can be advantageously utilized according to this embodiment of the invention.

In another embodiment an adaptive transfer function is determined by least square minimization of the error function of Equation 5 below.

$$E = \sum_{k=0}^{K-1} (L(k, l) - R(k, l))^2, \quad \text{(Eq. 5)}$$

wherein E is the computed error and K is the number of pixel positions that are used in the minimization, R(k,l) represents pixels in the current reconstructed frame 10. In this case the error function for column-wise transfer function is shown (k in the range of 0, . . . , K).

Equation can be used for selecting a spatial transfer function, by performing least squares minimization by evaluating the summed squared difference for a set of spatial transfer functions as available in for example H.264 [7].

Alternatively, by taking derivatives with respect to the coefficients of a single spatial transfer function and setting the result to zero, a set of linear equations are obtained, from which the coefficients of the alignment transfer function can be solved numerically.

By taking the derivatives with respect to the coefficients of the transfer function and setting the result to zero, a set of linear equations are obtained, from which the coefficients of the transfer function can be solved numerically.

By performing this optimisation for part of the already decoded pixels and testing it on another part closer to the block to be generated, the generated block of the local structure of reconstructed pixels 30 may be used depending on the test result. The robustness of the method can be increased by considering several reconstructed columns in the error function. Similarly a row-wise transfer function can be determined.

In another example creating 20 a local structure of reconstructed pixels 30 can also be performed by polynomial modelling of previously reconstructed pixels from the current reconstructed frame 10. A polynomial model is a representation of pixel values in a region using basic spatial transfer functions that are constant for all pixel values in the region, and using polynomials up to a certain power of horizontal (x) and vertical (y) positions, see Equation 6. A polynomial model or any other smooth model can also be used in combination with a local extrapolation approach to enable a local structure of reconstructed pixels 30 to be created that also maintains strong edges and lines from the previously reconstructed pixels in current reconstructed frame 10.

The local structure of reconstructed pixels can be represented below by a polynomial model of Equation 6:

$$L(k, l) = \sum_{p=0}^{P-1}\sum_{q=0}^{Q-1} a(q, p)k^q l^p \quad \text{(Eq. 6)}$$

wherein L(k,l) is a pixel of the local structure 30 at row k and column l, a(q,p) is the value of respective polynomial coefficient, and P and Q is the order of the polynomial in respective direction. The polynomial coefficients can be determined on nearby pixels from the currently reconstructed frame 10 using least squares minimization, similar as shown in Equation 5.

The above approaches of creating 20 a local structure of reconstructed pixels 30 of extrapolation and polynomial modelling use already reconstructed pixels in the current reconstructed frame 10. Alternatively it is also possible to perform creating 20 a local structure of reconstructed pixels 30 from pixels from one or more previously reconstructed frames 12, similar to inter-frame prediction.

Creating 20 a local structure of reconstructed pixels 30 can be performed by inter-frame prediction using the inter-frame prediction information 23 or motion compensated block 31 (not shown in FIGS. 2A and 2B) corresponding to predicted block 9.

Likewise, creating 20 a local structure of reconstructed pixels 30 can alternatively be performed by inter-frame prediction of the current predicted block using inter-frame prediction information of a neighbouring block.

Depending on the characteristics of the pixel variations it can be beneficial to use combinations of pixels from the current reconstructed frame 10 and from the previously reconstructed frame 12, or simply switch between them when creating 20 a local structure of reconstructed pixels 30. One example is to use the current reconstructed frame 10 when the Sum of Absolute Differences (SAD) between the pixels outside the current block in the current reconstructed frame 10 and the corresponding pixels in the previously reconstructed frame 12 is larger than the SAD between the predicted block 9 and the local structure of reconstructed pixels 30 generated from the current reconstructed frame 10.

Furthermore regions that are difficult to predict, but which are important for alignment, may have coded residual side information added to the local structure 30, to enable a better match with the original. This residual side information is generated in the encoding process and is coded for use in the decoding process.

Re-sampling or interpolation may be part of the creating 20 a local structure of reconstructed pixels 30 when the created local structure 30 does not completely match the underlying pixel grid. Interpolation and re-sampling resolves this mismatch, for example by means of bi-linear interpolation, well known in the art.

Alignment

Alignment 21 can be achieved according to an embodiment of the invention by positioning the predicted block 9 with respect to the local structure of reconstructed pixels 30 according to the location of the best match of pixels from the predicted block 9 and corresponding pixels from the local structure. Positioning may involve translation and/or rotation of the predicted block 9 in any direction with respect to the local structure of reconstructed pixels 30. Below some exemplary embodiments of alignment 21 of a predicted block 9 will be discussed in order to achieve an aligned predicted block 22.

According to an embodiment of the invention a spatial transfer function for pixel displacement from the above defined set (see [7]) is applied to align 21 a predicted block 9 with the local structure 30. This is performed in both the encoder and the decoder so the selected alignment transfer function need not to be encoded in step 5, however may be encoded 5 in order to speed up the process of decoding of FIG. 3B.

In an embodiment of the invention the alignment transfer function is applied on a predicted block 9 as shown in Equation 7.

$$A(k, l) = \sum_{i=0}^{N-1}\sum_{j=0}^{M-1} w_a a(i, j) P\left(k - i + \text{int}\left(\frac{N}{2}\right), l - j + \text{int}\left(\frac{M}{2}\right)\right) + o_a, \quad \text{(Eq. 7)}$$

wherein A(k,l) is a pixel at row k and column l of the aligned predicted block 22, a(i,j) is a spatial alignment transfer function at position (i,j), $w_a$ is an alignment scaling factor and $o_a$ is an alignment offset. It can be noted that the predicted block 9 usually can be made somewhat larger than the current block 1 so that useful sample values are available for the transfer function coefficients when determining values near the border of the aligned predicted block 22, depending on the size of the spatial transfer function a(i,j) N, M in any direction. One advantage of applying the alignment transfer function a(i,j) directly to the predicted block 9 is that in this way the alignment transfer function is independent of the method used for obtaining the predicted block 9. This can for example be advantageous if the predicted block 9 is obtained by a non-linear transfer function.

In another embodiment of the invention an alignment transfer function as described above is applied directly to the reference frame, i.e. the current reconstructed frame 12 or the previously reconstructed frame 10, instead of applying a transfer function to the reference frame to obtain the predicted block 9 and subsequently applying another transfer function for aligning to the local structure. An equation to this effect is shown below in Equation 8:

$$A(k, l) = \sum_{i=0}^{N-1}\sum_{j=0}^{M-1} w_a wa(i, j) R\left(k - i + \text{int}\left(\frac{N}{2}\right) + \text{int}(v_x), \right. \quad \text{(Eq. 8)}$$

$$\left. l - j + \text{int}\left(\frac{M}{2}\right) + \text{int}(v_y)\right) + o + o_a$$

If the predicted block 9 was obtained by a linear transfer function, the alignment transfer function a(i,j) can be applied directly on the reference frame, i.e. the current reconstructed frame 10 or the previously reconstructed frame 12. This avoids sequential application of the transfer function $f(i,j)$ to obtain the predicted block 9 and separate application of an alignment transfer function.

In another embodiment of the invention a transfer function $f(i,j)$ indicated by the prediction information 45 is used as a starting point and an alignment transfer function a(i,j) performs a refinement of the transfer function $f(i,j)$, as shown in Equation 9:

$$A(k, l) = \quad \text{(Eq. 9)}$$

$$\sum_{i=0}^{N-1}\sum_{j=0}^{M-1} w_a w(f(i, j) + a(i, j)) R\left(k - i + \text{int}\left(\frac{N}{2}\right) + \text{int}(v_x), l - \right.$$

-continued $$j + \text{int}\left(\frac{M}{2}\right) + \text{int}(v_y) + o + o_a$$

The reason for this embodiment is to allow for an alignment transfer function with only a few number of coefficients. This reduces complexity of deploying the alignment transfer function.

In the Equations 7 to 9 above the spatial support of the transfer function $f(i,j)$ and the alignment transfer function $a(i,j)$ is the same. It can also be the case that the spatial support of the alignment transfer function $a(i,j)$ is different from the spatial support of the transfer function $f(i,j)$. In other words the alignment transfer function $a(i,j)$ can have a different number of coefficients than the number of coefficients for the transfer function $f(i,j)$.

In an embodiment of the invention different a set of predetermined alignment transfer functions is established, each having different properties with respect to transfer function properties such as lowpass or high pass and/or displacement. Each of the predetermined alignment transfer functions is tested and the one that gives a best match with the local structure 30 is selected for alignment 21 of the predicted block 9.

In another embodiment of the invention an adaptive alignment transfer function is used. The alignment transfer function $a(i,j)$ that gives an aligned predicted block 22 with best match with the local structure 30 is selected. The best match can be evaluated as the sum of squared differences (SSD) or sum of absolute differences (SAD) between the local structure 30 and corresponding pixels of the aligned predicted block 22, where the best match is the transfer function with the lowest sum. The best match can also be weighted according to Fourier properties of the differences to for example punish low frequency differences which are more visible more than high frequency differences which are less visible.

Least square minimization between the aligned predicted block 22 and the local structure 30 is used as shown below.

$$E = \sum_{k=0}^{K-1}\sum_{l=0}^{L-1} (L(k,l) - A(k,l))^2, \quad \text{(Eq. 10)}$$

wherein $L(k,l)$ is the value of the local structure at row k and column l, K and L specify a region used in the alignment within the local structure of reconstructed pixels 30, $A(k,l)$ is the resulting aligned predicted block 22 after applying a spatial transfer function as described above. K and L are usually equal or smaller than the size of the aligned predicted block 22.

As in Equation 5, Equation 10 can be used for performing least squares minimization by evaluating the summed squared difference for a set of spatial transfer functions as available in for example H.264 [7].

Alternatively, by taking derivatives with respect to the coefficients of a single alignment transfer function and setting the result to zero, a set of linear equations are obtained, from which the coefficients of the alignment transfer function can be solved numerically. This is similar to what is done when finding optimal transfer functions in [1] but in this case by minimizing Equation 10.

It can be noted that the region used for the alignment can be irregular. The region may contain for example an edge along which predicted block 9 is to be aligned, so pixel values around the edge in the local structure 30 can be used.

When applying one of the above described spatial transfer functions, a mismatch may exist in gain and/or offset. In an embodiment according to the invention, a predicted block 9 may be also aligned to the local structure of reconstructed pixels 30 by rescaling and applying an offset to the predicted block 9, using the Equations 8 or 9 above, wherein $w_a$ and $o_a$ denote a scaling factor and offset for alignment 21 respectively.

Furthermore the spatial transfer function $a(i,j)$, can be established on the basis of a transform of the predicted block 9 and a transform of corresponding pixels of the local structure of reconstructed pixels 30. A transform may for example be obtained by means of Fourier transformation, whereby either the transformed phase diagram or the transformed amplitude diagram of (part of) a predicted block 9 is used for matching with a transform of the created local structure. This can be particularly useful for aligning an edge in the predicted block 9 with an edge in the local structure of reconstructed pixels 30, whereby the phase diagram of a Fourier transformed image can be used to align the faces of the corresponding edges.

Another example of performing alignment 21 using transforms is matching using Fourier frequency content. A row in an initial predicted block 9 can be smoothed or sharpened to better match the Fourier frequency content of previously reconstructed pixels in the local structure of reconstructed pixels 30. Smoothing can be considered as enhancing error resiliency when similarity between the local structure of reconstructed pixels 30 and the predicted block 9 is weak due to for example errors that may arise during transmission or storage and retrieval in the encoded video frame 18.

Alignment 21 using pixel values of the predicted block 9 and alignment 21 using transformed pixels of the predicted block 9 may be used successively, wherein the alignment 21 of transformed pixels can be used to further refine a previous alignment.

Furthermore, alignment 21 can be performed by matching other properties associated with pixels in the predicted block 9 and pixels in the local structure of reconstructed pixels 30. Examples of such properties are motion vectors, average pixel values (DC), chrominance, luminance, or any other function derived from or associated with pixel values.

Any method of creating 20 a local structure of reconstructed pixels 30 can be used in combination with any method of alignment 21. During encoding/decoding an optimal approach for creating 20 a local structure of reconstructed pixels 30 and/or alignment 21 can be chosen. Pixel positions of the local structure of reconstructed pixels 30 with strong local image gradient may be more important in finding a best match with a row/column/part of the predicted block 9 than pixel positions with weak local gradient. Weak gradients may be coding noise. Such a region may be avoided. Thus pixels having a higher gradient value may be weighed more than pixels with a low gradient in establishing a match between pixels of the predicted block 9 with the local structure 30.

Transfer functions may also be used in template matching according to the state of the art. In template matching the best transfer function is selected from a set of displacement transfer functions in both the encoder and decoder, see reference [3]. It uses the vertical and horizontal displacements $v_l$ and $v_k$ from the prediction information 45 to select the area of interest for the search of the transfer function. Then it refines the initial displacement by testing small variations of full pixel displacements. The transfer function is determined by applying different re-positioning transfer functions on an area outside the area pointed out by the integer displacements $\text{int}(v_l)$ and int($v_k$) and select the one that gives least absolute error compared to the corresponding area outside the predicted block, e.g. the template. The selected displacement and transfer function are then used to produce predicted block 9. Template matching conventionally according to the state of the art typically uses reconstructed pixels outside the region of the predicted block 9. According to the invention template matching may be used in alignment according to an embodiment of the invention when the template matching is applied to the local structure of reconstructed pixels 30.

EXAMPLES

Below some more examples of combinations of creating 20 a local structure of reconstructed pixels 30 and alignment 21 will be described.

Inter-Frame Prediction by Alignment to Pixels in Current Frame

This describes how an embodiment according the invention can be used for improving the inter-frame prediction of a H.264 like coder. To create a local structure of reconstructed pixels 30 according to the invention, inter-frame prediction information 23 which costs few bits to encode is selected, like for example the P16×16 macroblock type in H.264. The selected macroblock type is then used as in the standard to obtain a predicted block 9. Then row-wise and column-wise analysis is performed to establish the local structure of reconstructed pixels 30. The inter-frame predicted block 9 is then aligned 21 with the local structure of reconstructed pixels 30.

The alignment transfer function that gives least SAD compared to the local structure of reconstructed pixels 30 is selected. Alignment 21 can be performed such that the predicted block 9 is filtered to obtain a good match. To improve the accuracy of the alignment 21, individual 4×4 blocks of the 16×16 predicted block 9 can be tuned and coded block by block to generate up to 16 adjustments of the 16×16 macroblock. Rate distortion (RD) optimization can be performed to select which macroblock type to use, e.g. same as in the standard case, but in this applying the teachings of the invention to the standard P16×16 macroblock mode.

Inter-Frame Prediction by Alignment to a Prediction According to Neighbouring Inter-Frame Prediction Information Creating 20 a local structure of reconstructed pixels 30 can be performed by applying inter-frame prediction information from a neighbouring block for inter-frame prediction of the current block 1. The predicted block 9 of the current reconstructed frame 10 using the current inter-frame prediction information can then be aligned 21 to make a better match with the local structure of reconstructed pixels 30, especially along the block border to the neighbouring block where the other inter-frame prediction information comes from.

Using the Local Structure as an Intra-Frame Prediction

An embodiment of the invention can be used for improving the intra-frame prediction of an H.26X-like encoder. In this case one of the intra-frame prediction information 24, for example an Intra4×4 coding mode in H.264, has been modified to make a combination of two predictions. One of the predictions is the predicted block 9 according to standard intra-frame prediction information 24 and the other prediction is chosen to be the local structure of reconstructed pixels 30. The two predictions are combined, i.e. the by aligning 21 the intra-frame prediction block 9 with the local structure of reconstructed pixels 30 by for example weighted averaging, to produce the aligned predicted block 22.

Alternatively, a local structure of reconstructed pixels 30 can be created 20 by analysing previously reconstructed pixels in 10, at least two rows and two columns above respectively to the left of the block to be predicted block 9. A transfer function, i.e. spatial extrapolation function, for predicting a row below or a column to the left is determined. This can be done by minimization of the squared difference between the prediction of a row/column and the reconstructed values of the row/col. The local structure 30 is then generated by applying the selected transfer function on one row/column to obtain the next row/column and so on.

Rate distortion optimization can be performed to select which intra-frame prediction information 24 to use for each 4×4 block predicted block 9, e.g. same as is typically done in the standard case, but in this case using the aligned predicted block 22 as one of the intra-frame prediction information 24 as described above. This means that the prediction that gives the best RD performance will be selected, which can be signalled 24 to the decoding process.

Intra-Frame Prediction by Alignment to an Inter-Frame Prediction

Creating 20 a local structure of reconstructed pixels 30 can be performed by inter-frame prediction using the global inter-frame prediction information 23 such as global motion of the frame or the motion from neighbouring macroblocks. Then an intra-frame predicted block 9 can be aligned 21 with the created local structure of reconstructed pixels 30 to obtain an aligned predicted block 22. Since the intra-frame prediction only is guided by the inter-frame prediction but the actual prediction is performed from previously decoded pixels in the current reconstructed frame 10 the aligned predicted block will potentially be better than the intra-frame prediction block 9 but still have good error resilience properties. Further improved error resilience can be achieved by avoiding aligning 21 of the intra-frame predicted block 9 if the block border pixels of the local structure of reconstructed pixels 30 are very different from the main structure of the intra-frame predicted block 9.

Intra-Frame Prediction by Alignment with a Local Structure

In the step of generating a predicted block 9, one or several intra-frame predictions can be generated by any user preferred method and the parameters for selection 17 of the method can be coded. The invention can then be used to align 21 one or several of those predictions to produce an aligned predicted block 22 which is better aligned with the local structure of reconstructed pixels 30. Additional intra-frame prediction information 24 can also be added to describe how the aligned predicted block 22 is produced.

Use of Local Structure in Prediction Information Decision

A local structure of reconstructed pixels 30 is created 20 using either surrounding pixels in the current reconstructed frame 10 or pixels from previous frames 12 (using inter-frame prediction information from neighbouring blocks) for the whole or part of the current block 1 that is to be encoded. This local structure of reconstructed pixels 30 can then be used to perform intra-frame prediction information decision 16 and possibly inter-frame prediction information estimation 13 (based on for example rate-distortion optimization with respect to the local structure of reconstructed pixels 30). Since the local structure of reconstructed pixels 30 is available in both the encoding process and the decoding process there is no need to encode/transmit the prediction information. Therefore bit rate savings can be achieved.

Improved Template Matching

A local structure of reconstructed pixels 30 can be used to improve template matching by switching between template matching and matching based on the local structure of reconstructed pixels 30. Another approach is to constrain the template matching to predictions with similarity between the adjacent previously decoded pixels in 10 and the border pixels of the predicted block 9. A prediction from a template matching approach can also be fine tuned according to a local structure of reconstructed pixels 30 to produce an aligned predicted block 22.

Constrained Inter-Frame Prediction Information Estimation

A local structure of reconstructed pixels 30 can be used for inter-frame prediction information estimation in a standard encoding process. In this case the inter-frame prediction information estimation can be constrained to give a prediction with similarity between the adjacent previously decoded pixels in 10 and the border pixels of the predicted block 9.

Mutual Alignment of Adjacent Blocks

In an embodiment the invention can be extended so that the alignment operation 21 is not only performed on the current block 1 that is to be encoded but also that it affects the pixels in a neighbouring block so that structures will be reconstructed smoothly across the block borders. Alignment 21 can be performed before or after the addition of the inverse transformed/dequantized residual block 25.

Use of a Local Structure to Adjust Inter-Frame Prediction

In alignment 21 of a predicted block 9 with the local structure of reconstructed pixels 30 a transfer function can be determined to locally tune the transfer function used for inter-frame prediction.

FIG. 5A shows a block diagram of an encoding apparatus according to an exemplary embodiment of the invention. An encoding apparatus generally comprises an input interface 34 for acquiring a input video frame 12, a processing means 35 and a memory 37 and/or dedicated hardware for video encoding, and an output interface 36 for outputting an encoded video frame 18.

The encoding apparatus can be comprised in, for example, a communication terminal such as a telephone or mobile phone or personal computer or any other device equipped with a camera, arranged for digital communication or storage of video captured with the camera or any other device for processing video frames. Furthermore devices for storing, transmitting or transcoding digitised video may apply.

An input video frame 47 as described can be received or acquired via input interface 34. Input video frames 47 may be received as an electronic video signal, in analog or digital form. In the case of receiving analog video signals, the input interface is equipped with an analog-to-digital converter. In the case of receiving a digital video signal the input interface is arranged accordingly, well known for an average person skilled in the art. The input video frame 47 may for example be received from a camera, camcorder, video player, CD-ROM/DVD player and the like.

The processing means 35 may comprise a microprocessor, DSP, microcontroller or any device suitable for executing program instructions and dedicated hardware. Dedicated hardware may comprise specialized integrated circuits, Field Programmable Gate Arrays and the like for performing some or all steps the steps of encoding the input video frames 47 as a whole or in part as shown in FIG. 3A.

The program instructions of the video encoding apparatus may be loaded into the memory 37 from a computer readable medium such as a CD-ROM, DVD, a hard disk, a floppy disc, or from any other medium having previously stored program instructions, via an appropriate interface according to the state of the art. The program instructions are arranged such that they, when executed by the processing means 35, perform the steps of encoding the input video frame 47 as described above.

The result of the encoding of the input video frame 47, the encoded video frame 18, may be output as a digital signal for transmission to another device for decoding, for storage or any other purpose via output interface 36 arranged for such purpose and well known to the average person skilled in the art.

FIG. 5B shows a block diagram of a decoding apparatus according to an exemplary embodiment of the invention. A decoding apparatus generally has an input interface 38 for receiving an encoded video frame 18, processing means 39 and a memory 41 and/or dedicated hardware for video decoding, and an output interface 40 for outputting a decoded video frame 29.

The decoding apparatus can be, but is not limited to a communication terminal such as a telephone or mobile phone or personal computer or any other device equipped with a display, arranged for digital communication or display of encoded video. Furthermore devices for storing, receiving or transcoding digitised video or any other device for processing video frames may apply. The decoding apparatus may also be comprised in any one of such devices.

The input interface 38 is arranged for receiving the encoded video frame 18, which may be output from a video encoding apparatus and sent to the video decoding apparatus though a communication link, e.g. a wired or wireless connection. The encoded video frames 18 may also be output from any storage device known in the art, such as a CD-ROM, DVD, PC hard disk etc.

The processing means 39 may comprise a microprocessor, DSP, microcontroller or any device suitable for executing program instructions and dedicated hardware. Dedicated hardware may comprise specialized integrated circuits, Field Programmable Gate Arrays and the like for performing some or all steps the steps of decoding the encoded video frames 18 as a whole or in part as shown in FIG. 3B.

The program instructions of the video encoding apparatus may be loaded into the memory 41 from a computer readable medium such as a CD-ROM, DVD, a hard disk, a floppy disc, or from any other medium having previously stored program instructions, via an appropriate interface according to the state of the art. The program instructions are arranged such that they, when executed by the processing means 39, perform the steps of decoding the encoded video frame 18 as described above.

The result of the decoding process, the decoded video frame 29, may be output for display or any other purpose via decoder output interface 40. The decoded video frame 23 may be output as an analog video signal. For that purpose the output interface 40 may have a digital-to-analog converter.

It must be understood that the embodiments in the description and figures are given by way of example only and that modifications may be made without departing from the scope of the invention as defined by the claims below.

REFERENCES

[1] Y. Vatis, B. Edler, D. T. Nguyen, J. Ostermann, "Two-dimensional non-separable Adaptive Wiener Interpolation Filter for H.264/AVC". VCEG-Z17, ITU-T, Study group 16, Question 6, April 2005.
[2] "Separable Adaptive Interpolation Filter", COM16-C219, Matsushita, July 2007
[3] "Decoder side MV derivation", VCEG-AG16, October 2007
[4] "Inter Frame Coding with Template Matching Averaging", In Proc. IEEE Int. Conf. Image Processing ICIP, San Antonio, Tx, USA, September 2007

[5] "Intra prediction by Averaged Template Matching Predictors", In Proc. IEEE Consumer Communications and Networking Conference CCNC, January 2007

[6] "Intra prediction based on displacement and template matching", VCEG-AE11, January 2007.

[7] ITU-T Recommendation H.264/ISO/IEC MPEG 14496-10, 2003.

The invention claimed is:

1. A method of encoding or decoding a current video frame by successively encoding or decoding different blocks of pixels of the current video frame, the method comprising, for a current block:
generating a predicted block as a prediction of the current block, from pixels of either:
a partially reconstructed current frame comprising an assembly of one or more previous blocks that have been reconstructed as if, or as actually, decoded; or
a reconstructed previous frame;
creating a local structure of reconstructed pixels in a region of the partially reconstructed current frame where the current block, as reconstructed, is to be assembled, the reconstructed pixels of the local structure differing from the corresponding pixels of the predicted block;
aligning the predicted block with the local structure to produce an aligned predicted block; and
encoding or decoding the current block based on the aligned predicted block.

2. The method of claim 1, wherein the method comprises encoding the current video frame, and wherein encoding the current block based on the aligned predicted block comprises:
generating a residual block by subtracting the aligned predicted block from the current block; and
encoding the residual block to generate an encoded video frame.

3. The method of claim 2, further comprising:
reconstructing the current block by adding the aligned predicted block back to the residual block; and
assembling the current block, as reconstructed, with the one or more previous blocks to update the partially reconstructed current frame for predicting subsequent blocks.

4. The method of claim 1, wherein the method comprises decoding the current video frame, and wherein decoding the current block based on the aligned predicted block comprises:
reconstructing the current block by adding the aligned predicted block to a residual block received for the current block; and
assembling the current block, as reconstructed, with the one or more previous blocks to update the partially reconstructed current frame.

5. The method of claim 1, wherein generating the predicted block comprises generating the predicted block from pixels of a reconstructed previous frame using inter-frame prediction information.

6. The method of claim 5, wherein creating the local structure comprises generating pixels of the local structure using pixels from the reconstructed current frame, according to intra-frame prediction.

7. The method of claim 1, wherein generating the predicted block comprises generating the predicted block from pixels of a partially reconstructed current frame using intra-frame prediction information.

8. The method of claim 7, wherein creating the local structure comprises generating pixels of the local structure using pixels from the reconstructed previous frame, according to inter-frame prediction.

9. The method of claim 1, wherein creating the local structure comprises generating pixels of the local structure using pixels from a reconstructed previous frame, according to inter-frame prediction information of a neighboring block.

10. The method of claim 1, wherein the predicted block and the local structure are both generated according to intra-frame prediction, or inter-frame prediction, but are generated with different techniques, thereby creating reconstructed pixels of the local structure that differ from the corresponding pixels of the predicted block.

11. The method of claim 1, wherein creating the local structure comprises extrapolating, or interpolating, pixels of the reconstructed current frame into said region.

12. The method of claim 1, wherein creating the local structure comprises:
determining a transfer function for predicting a row and/or column of pixels in the partially reconstructed current frame that is adjacent to the current block; and
applying the transfer function.

13. The method of claim 1, wherein aligning the predicted block with the local structure comprises:
matching properties of pixels of at least part of the predicted block with corresponding properties of pixels of the local structure; and
adapting the properties of the predicted block to the corresponding properties of the local structure based on the best match.

14. The method of claim 13, wherein matching properties of pixels of at least part of the predicted block with corresponding properties of pixels of the local structure comprises:
establishing a sum of squared differences, or of absolute differences, of the value of properties of pixels of at least part of the predicted block and the value of the corresponding properties of pixels of the local structure; and
determining the best match by the lowest sum.

15. The method of claim 13, wherein matching properties of pixels of at least part of the predicted block with corresponding properties of pixels of the local structure comprises determining a spatial transfer function between at least part of the predicted block and the local structure, and where adapting the properties of the predicted block to the corresponding properties of the local structure based on the best match comprises applying the spatial transfer function to the predicted block to obtain an aligned predicted block.

16. The method of claim 15, wherein determining a spatial transfer function between part of the predicted block and the local structure comprises selecting a spatial transfer function from a set of predetermined spatial transfer functions.

17. The method of claim 13, wherein aligning the predicted block to the local structure comprises sub-pel interpolating pixels of the predicted block and/or of the local structure to allow sub-pel matching and sub-pel positioning of the predicted block with respect to the local structure.

18. The method of claim 13, wherein matching properties of pixels of at least part of the predicted block with corresponding properties of pixels of the local structure and adapting the properties of the predicted block to the corresponding properties of the local structure based on the best match is performed on pixels originating the predicted block.

19. The method of claim 13, wherein the properties of pixels of at least part of the predicted block and corresponding properties of pixels of the local structure are based upon a transform of pixels of the local structure, and wherein the predicted block is adapted according to the transform of pixels of the local structure on the basis of the best match.

20. The method of claim 13, wherein matching properties of pixels of at least part of the predicted block with corresponding properties of pixels of the local structure comprises determining a position best matching pixel values of the predicted block with pixel values of the local structure of reconstructed pixels, and wherein adapting the properties of the predicted block to the corresponding properties of the local structure comprises positioning the predicted block to the position best matching pixel values of the predicted block with pixel values of the local structure of reconstructed pixels.

21. An apparatus configured to encode or decode a current video frame by successively encoding or decoding different blocks of pixels of the frame, the apparatus comprising:
- an input interface configured to receive the current video frame;
- an output interface configured to output the current video frame, as encoded or decoded; and
- one or more processing circuits and a memory configured to:
  - generate a predicted block as a prediction of the current block, from pixels of either:
    - a partially reconstructed current frame comprising an assembly of one or more previous blocks that have been reconstructed as if, or as actually, decoded; or
    - a reconstructed previous frame;
  - create a local structure of reconstructed pixels in a region of the partially reconstructed current frame where the current block, as reconstructed, is to be assembled, the reconstructed pixels of the local structure differing from the corresponding pixels of the predicted block;
  - align the predicted block with the local structure to produce an aligned predicted block; and
  - encode or decode the current block based on the aligned predicted block.

22. The apparatus of claim 21, wherein the apparatus is configured to encode the current video frame, and wherein the one or more processing circuits and the memory are configured to encode the current block based on the aligned predicted block by:
- generating a residual block by subtracting the aligned predicted block from the current block; and
- encoding the residual block to generate an encoded video frame.

23. The apparatus of claim 22, wherein the one or more processing circuits and the memory are further configured to:
- reconstruct the current block by adding the aligned predicted block back to the residual block; and
- assemble the current block, as reconstructed, with the one or more previous blocks to update the partially reconstructed current frame for predicting subsequent blocks.

24. The apparatus of claim 21, wherein the apparatus is configured to decode the current video frame, and wherein the one or more processing circuits and the memory are configured to decode the current block based on the aligned predicted block by:
- reconstructing the current block by adding the aligned predicted block to a residual block received for the current block; and
- assembling the current block, as reconstructed, with the one or more previous blocks to update the partially reconstructed current frame.

25. The apparatus of claim 21, wherein the one or more processing circuits and the memory are configured to generate the predicted block from reconstructed pixels in a previously reconstructed frame using inter-frame prediction information.

26. The apparatus of claim 25, wherein the one or more processing circuits and the memory are configured to generate pixels the local structure using pixels from the reconstructed current frame, according to intra-frame prediction.

27. The apparatus of claim 21, wherein the one or more processing circuits and the memory are configured to generate the predicted block from pixels of a partially reconstructed current frame using intra-frame prediction information.

28. The apparatus of claim 27, wherein the one or more processing circuits and the memory are configured to generate pixels of the local structure using pixels from the reconstructed previous frame, according to inter-frame prediction.

29. The apparatus of claim 21, wherein the one or more processing circuits and the memory are configured to generate pixels of the local structure using pixels from a reconstructed previous frame, according to inter-frame prediction information of a neighboring block.

30. The apparatus of claim 21, wherein the one or more processing circuits and the memory are configured to generate both the predicted block and the local structure according to intra-frame prediction, or inter-frame prediction, but to generate them with different techniques, thereby creating reconstructed pixels of the local structure that differ from the corresponding pixels of the predicted block.

31. The apparatus of claim 21, wherein the one or more processing circuits and the memory are configured to create the local structure by extrapolating, or interpolating, pixels of the reconstructed current frame into said region.

32. The apparatus of claim 21, wherein the one or more processing circuits and the memory are configured to create the local structure by:
- determining a transfer function for predicting a row and/or column of pixels adjacent to the predicted block; and
- applying the transfer function.

33. The apparatus of claim 21, wherein the one or more processing circuits and the memory are configured to align the predicted block with the local structure by:
- matching properties of pixels of at least part of the predicted block with corresponding properties of pixels of the local structure; and
- adapting the properties of the predicted block to the corresponding properties of the local structure based on the best match.

34. The apparatus of claim 33, wherein the one or more processing circuits and the memory are configured to match properties of pixels of at least part of the predicted block with corresponding properties of pixels of the local structure by:
- establishing a sum of squared differences, or of absolute differences, of the value of properties of pixels of at least part of the predicted block and the value of the corresponding properties of pixels of the local structure; and
- determining the best match by the lowest sum.

35. The apparatus of claim 33, wherein the one or more processing circuits and the memory are configured to match properties of pixels of at least part of the predicted block with corresponding properties of pixels of the local structure by determining a spatial transfer function between at least part of the predicted block and the local structure, and to adapt the properties of the predicted block to the corresponding properties of the local structure based on the best match by applying the spatial transfer function to the predicted block to obtain an aligned predicted block.

36. The apparatus of claim 35, wherein the one or more processing circuits and the memory are configured to determine a spatial transfer function between part of the predicted block and the local structure comprises selecting a spatial transfer function from a set of predetermined spatial transfer functions.

37. The apparatus of claim 33, wherein the one or more processing circuits and the memory are configured to align the predicted block to the local structure by sub-pel interpolating pixels of the predicted block and/or of the local structure to allow sub-pel matching and sub-pel positioning of the predicted block with respect of the local structure.

38. The apparatus of claim 33, wherein the one or more processing circuits and the memory are configured to match properties of pixels of at least part of the predicted block with corresponding properties of pixels of the local structure and adapt the properties of the predicted block to the corresponding properties of the local structure based on the best match on pixels originating the predicted block.

39. The apparatus of claim 33, wherein the properties of pixels of at least part of the predicted block and corresponding properties of pixels of the local structure are based upon a transform of pixels of the local structure, and wherein the predicted block is adapted according to the transform of pixels of the local structure on the basis of the best match.

40. The apparatus of claim 33, wherein the one or more processing circuits and the memory are configured to match properties of pixels of at least part of the predicted block with corresponding properties of pixels of the local structure by determining a position best matching pixel values of the predicted block with pixel values of the local structure of reconstructed pixels, and to adapt the properties of the predicted block to the corresponding properties of the local structure by positioning the predicted block to the position best matching pixel values of the predicted block with pixel values of the local structure of reconstructed pixels.

* * * * *

UNITED STATES PATENT AND TRADEMARK OFFICE
CERTIFICATE OF CORRECTION

| | | Page 1 of 2 |
|---|---|---|
| PATENT NO. | : 9,049,457 B2 | |
| APPLICATION NO. | : 12/808958 | |
| DATED | : June 2, 2015 | |
| INVENTOR(S) | : Andersson et al. | |

It is certified that error appears in the above-identified patent and that said Letters Patent is hereby corrected as shown below:

On the Title Page, Item (75), under "Inventors", in Column 1, Line 1, delete "Gavle (SE);" and insert -- Gävle (SE); --, therefor.

On the Title Page, Item (75), under "Inventors", in Column 1, Line 2, delete "Frojdh," and insert -- Fröjdh, --, therefor.

On the Title Page, Item (75), under "Inventors", in Column 1, Line 3, delete "Vasby (SE);" and insert -- Väsby (SE); --, therefor.

On the Title Page, Item (75), under "Inventors", in Column 1, Line 4, delete "Skarpnack (SE);" and insert -- Skarpnäck (SE); --, therefor.

On the Title Page, Item (75), under "Inventors", in Column 1, Line 5, delete "Sjoberg," and insert -- Sjöberg, --, therefor.

On the Title Page, Item (56), under "OTHER PUBLICATIONS", in Column 2, Line 1, delete "Predictipn" and insert -- Prediction --, therefor.

On the Title Page, Item (56), under "OTHER PUBLICATIONS", in Column 2, Line 4, delete "Marraketch," and insert -- Marrakech, --, therefor.

On the Title Page, Item (57), under "ABSTRACT", in Column 2, Line 10, delete "block The" and insert -- block. The --, therefor.

On Page 2, Item (56), under "OTHER PUBLICATIONS", in Column 2, Line 1, delete "fur" and insert -- für --, therefor.

On Page 2, Item (56), under "OTHER PUBLICATIONS", in Column 2, Line 8, delete "consumeer" and insert -- consumer --, therefor.

Signed and Sealed this
First Day of December, 2015

Michelle K. Lee
*Director of the United States Patent and Trademark Office*

CERTIFICATE OF CORRECTION (continued)
U.S. Pat. No. 9,049,457 B2

On Page 2, Item (56), under "OTHER PUBLICATIONS", in Column 2, Line 11, delete "fur" and insert -- für --, therefor.

In the drawings

In Fig. 1A, Sheet 1 of 4, delete "FIG" and insert -- FIG. --, therefor at each occurrence throughout the figures.

In the specification

In Column 2, Line 30, delete "an decoded" and insert -- a decoded --, therefor.

In Column 2, Line 40, delete "steps of" and insert -- steps of: --, therefor.

In Column 16, Lines 33-34, delete "frame 12 or the previously reconstructed frame 10," and insert -- frame 10 or the previously reconstructed frame 12, --, therefor.

In Column 21, Line 31, delete "frame 12," and insert -- frame 47, --, therefor.

In Column 22, Line 47, delete "frame 23" and insert -- frame 29 --, therefor.